Sept. 26, 1950          D. W. RABENHORST          2,523,481

TEST AIRFOIL

Filed Nov. 26, 1947          3 Sheets-Sheet 1

Inventor
DAVID W. RABENHORST

By

Attorney

Sept. 26, 1950 D. W. RABENHORST 2,523,481
TEST AIRFOIL

Filed Nov. 26, 1947 3 Sheets-Sheet 2

Inventor
DAVID W. RABENHORST

Attorney

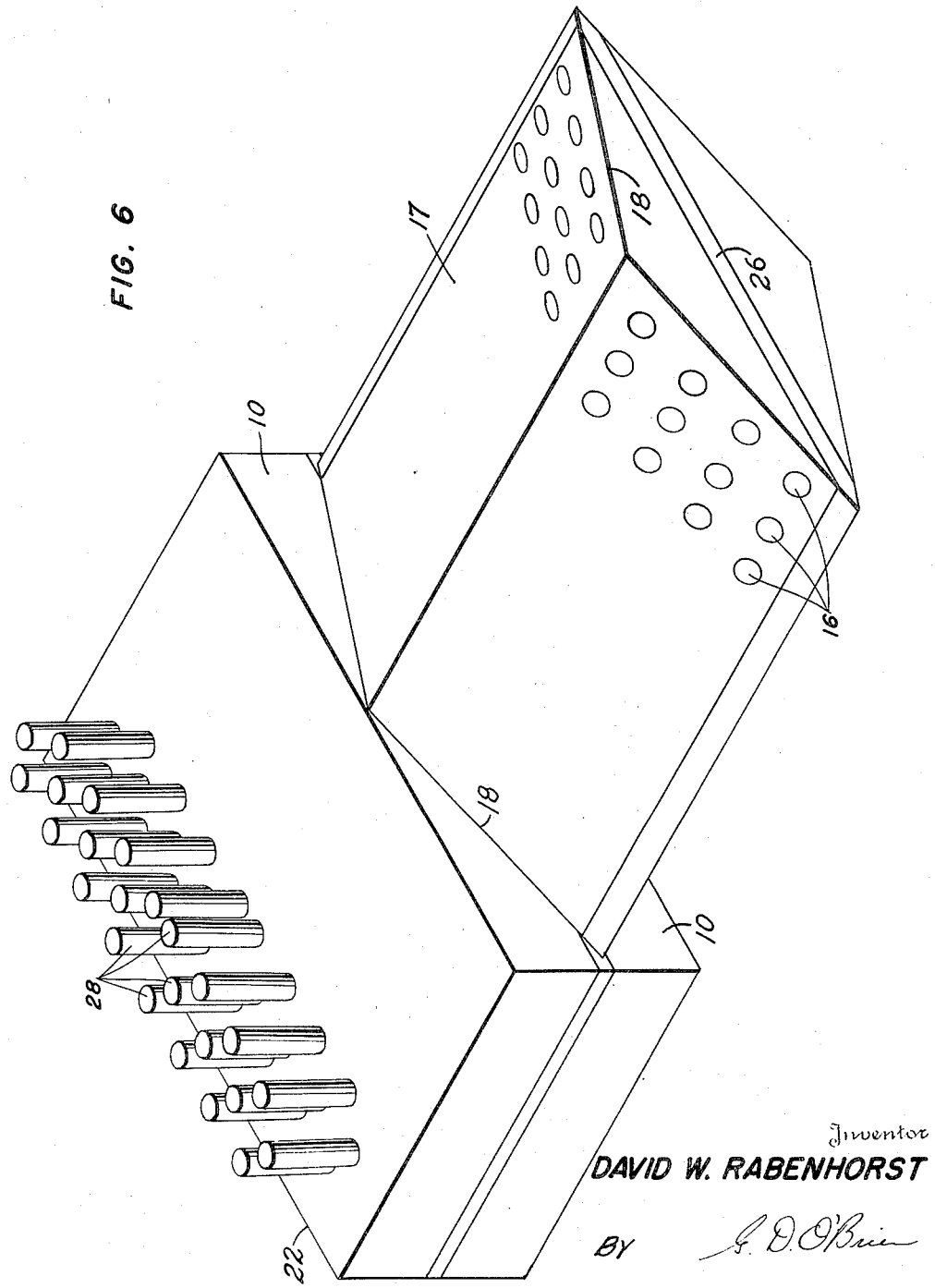

Patented Sept. 26, 1950

2,523,481

UNITED STATES PATENT OFFICE 2,523,481

TEST AIRFOIL

David W. Rabenhorst, Granby, Conn., assignor to United States of America as represented by the Secretary of the Navy Application November 26, 1947, Serial No. 788,235

2 Claims. (Cl. 73—147)

The present invention relates to an improved test airfoil.

In wind-tunnel tests, it is often necessary to determine simultaneously the pressures acting at a multiplicity of places on the surfaces of an airfoil. These pressures are measured by means of manometers, or other pressure indicators, connected to apertures in the surfaces of the airfoils by tubes. One method of producing such an airfoil has been to form it to the desired external shape and leave an open interior in which are installed tubes leading from the apertures to the manometers. This method of construction is complicated, since the tubes have to be put in place one at a time and each one entails difficult connection problems caused by the restricted working space.

An object of the present invention is to provide a method of airfoil construction which will provide suitable ducts or tubes from the apertures to the end of the airfoil, such ducts being made during the construction of the airfoil.

Another object of the invention is to provide means for simultaneously measuring the properties of a gas at different locations on the airfoil.

Another object of the invention is to provide an airfoil for testing which will be of relatively simple construction and which will be highly efficient in use.

Other objects will appear from the claims and description including the drawings wherein:

Fig. 6 is a perspective view of a completed model; and

In the accompanying drawings, forming a part of this specification, and in which like numbers are employed to designate like parts throughout the same, the preferred article and method are illustrated.

Figure 1:
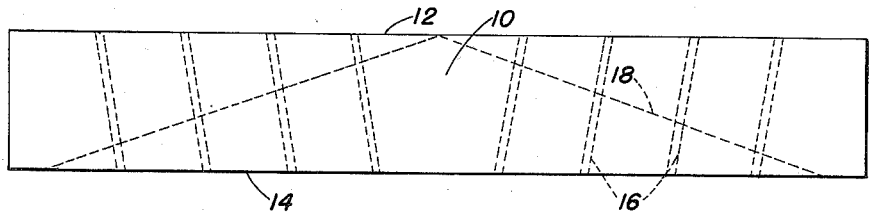
Fig. 1 is an end view of one of a pair of blanks for an airfoil model.
Figure 2:
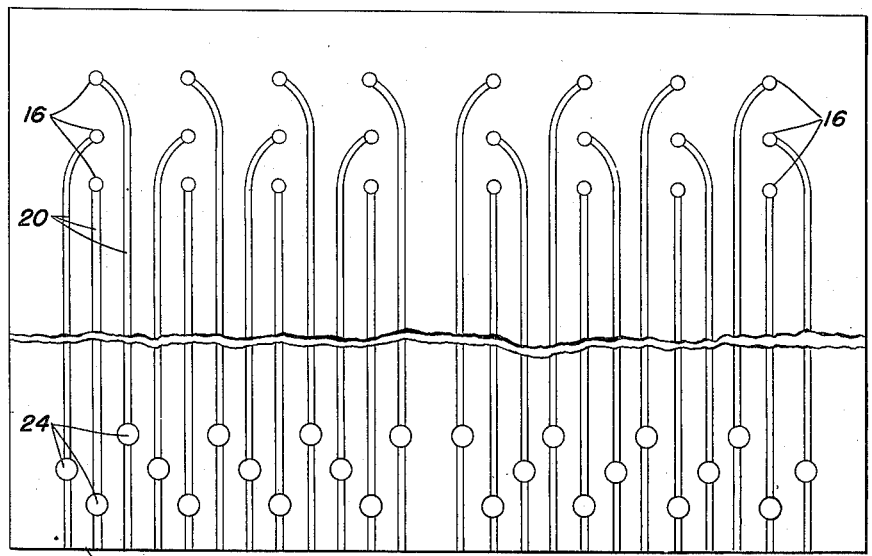
Fig. 2 is a plan of the blank, showing the inner surface.

Referring now to Figs. 1 and 2, a metal blank 10, having a ground plane outer face 12 and a ground plane inner face 14, together with a similar blank (not shown), form the principal components of an airfoil model. A number of small orifices 16 are bored through the blank 10 at such angles and in such locations that they will be normal to the surface and properly located on the surface of the airfoil section 17 of the completed model, represented in Figs. 1 and 4 by a broken line 18 and in Fig. 5 by full line 18a. After drilling a number of orifices 16, parallel longitudinally oriented grooves 20 are milled on the inner face 14 of the blank 10 from the orifices 16 to the end 22, spaced a distance therefrom, end 22 being the mounting end. A number of bores 24 are tapped through the mounting end to receive external connections and are arranged at spaced intervals to intersect the grooves.

Figure 3:
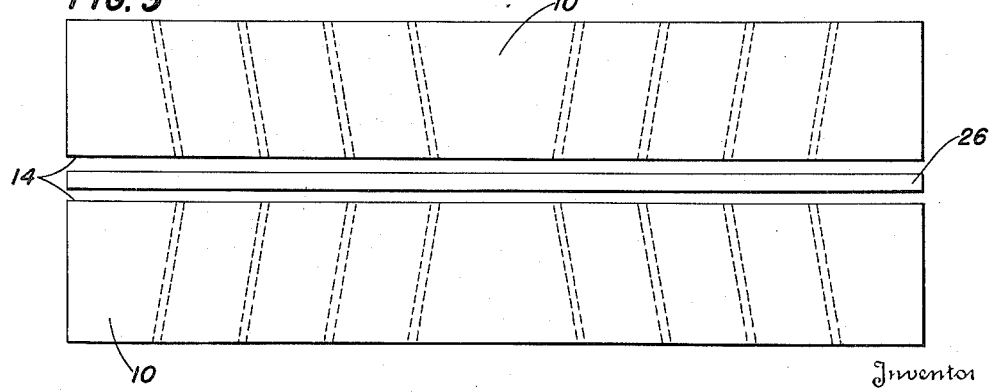
Fig. 3 is an end view demonstrating the method of assembly.
Figure 4:
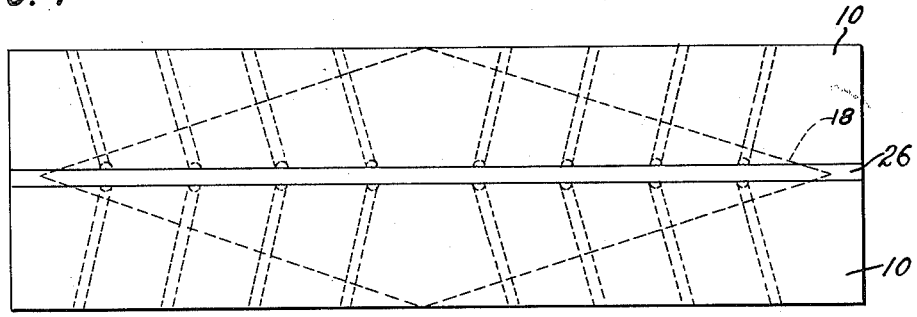
Fig. 4 is an end view of a completed blank assembly, prior to milling, showing the method of forming the airfoil model.

A sheet of metal 26 is placed between the inner faces 14 of the mating blanks 10, as shown in Fig. 3. The assembly is furnace brazed together to form a single unit, as shown in Fig. 4, which said welding seals the grooves 20 along the end 22. By this construction, the sheet 26 closes the open grooves 20, converting them into semi-circular passages, at each side of said sheet connecting the orifices 16 with the tapped bores 24.

In an alternative method of construction, the blanks 10 are pierced by a multiplicity of orifices 16 and tapped bores 24 after which the grooves 20 on the inner face 14 are formed, connecting the orifices with their associated tapped bores but not extending to the mounting end 22. This method of construction eliminates the necessity of closing ends of the grooves during final assembly.

Figure 5:
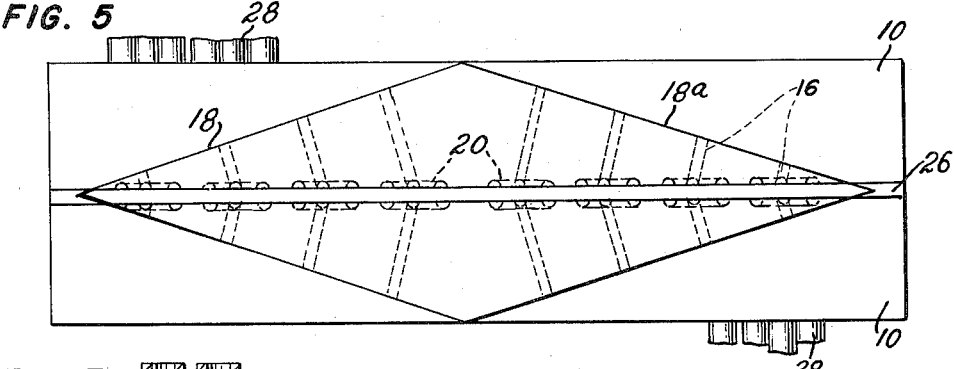
Fig. 5 is an end view of a completed model.

Referring now to Figs. 4, 5 and 6, the completed blank assembly, with the exception of the mounting end, is ground to airfoil shape as defined by the broken lines 18 to produce an airfoil model complete with the pressure measuring orifices 16. Tubes 28 are screwed into the tapped bores 24 to provide external connections, as shown in Fig. 6. Suitable connections are made between the ends of the tubes 28 and the pressure indicators when the model is tested.

Figure 7:
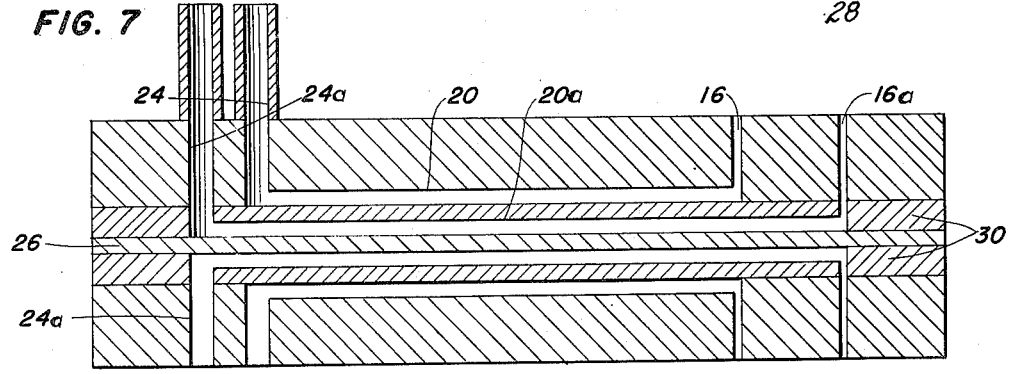
Fig. 7 is a longitudinal section of a modified form.

If it is desirable to have more orifices than can be accommodated by the construction described above, additional thin sheets of metal 30 may be interposed between the paired blanks 10, as shown in Fig. 7, to accommodate additional longitudinal grooves 20a connecting orifices 16a and bores 24a.

In the construction of Fig. 7, the blanks 10 are first drilled and grooved as described above; then a sheet of metal 30 is alined with each, by dowels or other similar means, and the additional orifices 16a and bores 24a are drilled through both the blank and the sheet, and the grooves 20a connecting them are cut in the surface of the sheet. The assembly is completed by placing the separating sheet 26 between the sheets 30 and brazing the entire assembly as described above.

What is claimed is:

1. A device of the character described, comprising a pair of blocks having mated faces, there being a plurality of orifices through said blocks, there being a plurality of measuring device connections, each comprising a bore having a tapped end, there being a plurality of grooves fashioned on the mating faces of said blocks and extending from said orifices to said connections, and a sheet of material interposed between said blocks to form enclosed passages out of said grooves.

2. An airfoil for test, including a pair of blocks each having a mounting end and a foil section, each of said foil sections being formed with a plurality of test orifices, and having a surface designed to mate with a corresponding surface on the other, said mating surfaces of said foil sections having grooves communicating between the mounting ends and said orifices, a separating sheet between said sections, the sections and said separating sheet being joined together to form a single airfoil unit having a plurality of orifices and said grooves communicating between said orifices and the exterior of said sections.

DAVID W. RABENHORST.

REFERENCES CITED

The following references are of record in the file of this patent:

UNITED STATES PATENTS

| Number | Name | Date |
| --- | --- | --- |
| 2,390,534 | Heuver | Dec. 11, 1945 |